United States Patent [19]
Kowal et al.

[11] Patent Number: 5,392,454
[45] Date of Patent: Feb. 21, 1995

[54] METHOD AND APPARATUS FOR SELECTIVELY ENABLING BI-DIRECTIONAL COMMUNICATION ONLY BETWEEN A DEDICATED PAIR OF TRANSCEIVERS

[75] Inventors: Henry J. Kowal, West Seneca; Charles A. Miess, Glenwood; Edward J. Szczepanski, Orchard Park; Paula A. McNerney, West Falls; Michael R. Morgante, Buffalo, all of N.Y.

[73] Assignee: Moog Inc., East Aurora, N.Y.

[21] Appl. No.: 965,204

[22] Filed: Oct. 23, 1992

[51] Int. Cl.⁶ .................................................. H04B 7/24
[52] U.S. Cl. ............................. 455/32.1; 340/825.52; 379/61; 455/54.1
[58] Field of Search ............... 455/38.1, 38.2, 58.2, 455/88, 54.1, 54.2, 66, 49.1, 32.1, 31.1, 352, 353, 89; 340/825.44, 825.5, 825.34, 825.52, 825.53, 825.72; 379/61

[56] References Cited

U.S. PATENT DOCUMENTS 4,593,155 6/1986 Hawkins ........................ 455/88 X
4,736,404 4/1988 Anglikowski et al. ............ 379/62
5,097,500 3/1992 Itoh ................................... 379/62

Primary Examiner—Curtis Kuntz
Assistant Examiner—Chi Pham
Attorney, Agent, or Firm—Phillips, Lytle, Hitchcock, Blaine & Huber

[57] ABSTRACT

An improved communication system (10) includes a plurality of transceivers (A, B, C, D, etc.) adapted to communicate with one another via a common communication path. Each transceiver has its own unique identity code. The invention provides a cable (11) for temporarily enabling the mutual exchanging of identity codes between only two of the transceivers so as to establish a dedicated pair. Each transceiver has memory (12) for receiving and storing the identity code of the other transceiver of the pair, and for purging any previously-stored identity code. Each transceiver is arranged to identify all communications transmitted by it as having originated from it, and as being addressed to the other transceiver of the pair. Each transceiver is also arranged to accept communications only if addressed to it and if identified as having originated from the other transceiver of the pair.

7 Claims, 2 Drawing Sheets 5,392,454

METHOD AND APPARATUS FOR SELECTIVELY ENABLING BI-DIRECTIONAL COMMUNICATION ONLY BETWEEN A DEDICATED PAIR OF TRANSCEIVERS

TECHNICAL FIELD

The present invention relates generally to the remote control and operation of machinery and mechanisms, and, more particularly, to an improved method and apparatus for selectively enabling bi-directional communication between only two of a larger number of transceivers so as to limit communication to only that dedicated pair.

BACKGROUND OF THE INVENTION

It is sometimes desired to permit the remote control operation of machinery. For example, U.S. Pat. No. 3,793,736 discloses apparatus for establishing a non-conductive data link between command and response locations. Thus, for example, an operator could command certain operations to be performed on overhead high-voltage lines and cables, without being directly in a conductive path.

In other applications, such as the remote operation of mining equipment, the operator may wish to place himself in a location removed from an environmental hazard.

In any event, in the remote operation of machinery, it is imperative that the machinery respond only to the intended command signal, and be non-responsive to any extraneous signal even if generated on the same communication path (e.g., frequency or data bus). In other words, cross-coupling should be prevented.

DISCLOSURE OF THE INVENTION

The present invention provides improved methods and apparatus for permitting the bi-directional exchange of data between two transceivers of a dedicated pair selected from a larger plurality of transceivers, but for preventing either transceiver of the pair from responding to data generated from a source other than the cooperative transceiver of its pair.

With parenthetical reference to the corresponding parts, portions or surfaces of the disclosed embodiment, merely for purposes of illustration and not by way of limitation, the present invention broadly provides an improved communication system (10), which includes: a plurality of transceivers (i.e., labeled A, B, C, D, E etc.) adapted to communicate with one another via a common communication path, each transceiver having a unique identity code; "handshake" means (11) for temporarily enabling the mutual exchange of identity codes between only two of the transceivers so as to establish a dedicated pair; each transceiver having memory means (12) for receiving and storing the identity code of the other transceiver of the pair during the mutual exchange and for simultaneously purging or removing any previously-stored identity code; each transceiver having addressing means (13) for identifying all communications transmitted by it as having been originated by it and being addressed to the other of the pair; and each transceiver having acceptance means (14) for accepting transmitted communications only if addressed to it and identified as having originated from the other transceiver of the dedicated pair; whereby one transceiver of pair will only communicate with the other transceiver of that pair. In the preferred embodiment, the "handshake" is provided by temporarily connecting the two transceivers of an intended pair with an electrical conductor.

The invention also provides an improved method of establishing selected communication between only two of a plurality of transceivers which are adapted to communicate with one another via a common communication path. Each transceiver has its own unique identity code. The improved method broadly includes the steps of: temporarily enabling the mutual exchange of identity codes between only two of the transceivers, termed a "handshake", so as to establish a dedicated pair; receiving and storing the identity code of the other receiver of the pair during the mutual exchange and simultaneously purging any previously-stored identity code; identifying all communications thereafter transmitted by it as having been originated by it and as being specifically addressed to the other of the pair; and accepted transmitted communications only if specifically addressed to it and identified as having originated from the other transceiver of the pair; thereby to establish selective communication between only the transceivers of the dedicated pair.

Accordingly, the general object of the invention is to provide an improved method and apparatus for permitting bi-directional communication only between the two transceivers of a dedicated pair.

Another object is to provide an improved communication system which is particularly adapted for use in the remote control and operation of machinery.

Still another object is to provide an improved communication system which has increased assurances against cross-coupling of signals.

These and other objects and advantages will become apparent from the foregoing and ongoing written specification, the drawings, and the appended claims.

MODE(S) OF CARRYING OUT THE INVENTION

Figure 1:
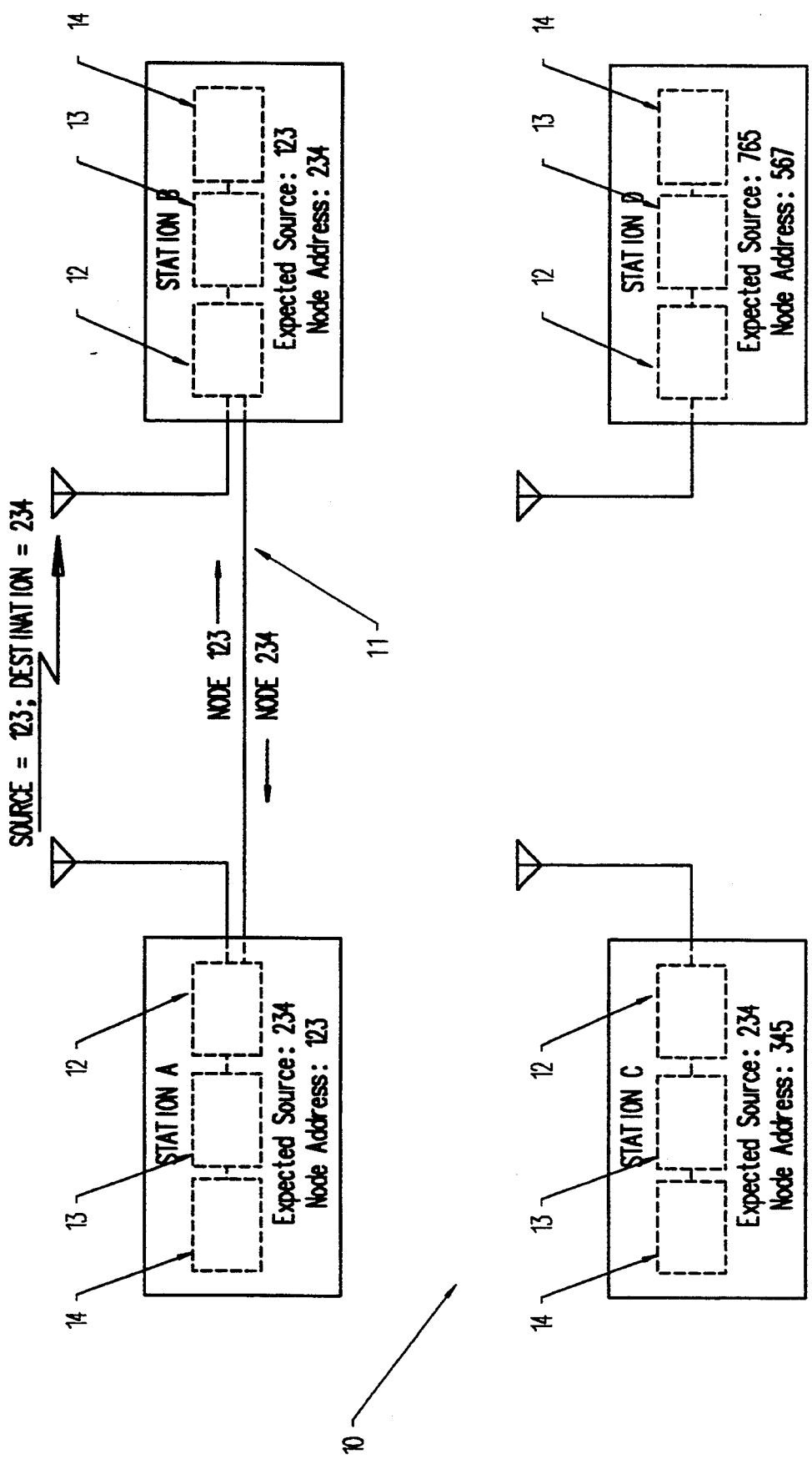
FIG. 1 is a schematic view of four transceivers, severally indicated as stations A, B, C and D, respectively, each having its own identity code or address, and also depicting a cable as temporarily connecting stations A and B in order to enable the mutual exchange of identity codes between only these two stations.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

As used herein, the word "transceiver" is intended to generically include various types of mechanisms for transmitting or generating, and receiving, signals of one form or another. Such transceivers include, but are not limited to, radio frequency (RF) communication stations. Thus, the signal itself could be an RF signal, an electrical signal, an optical signal, or the like.

Typically, in a multi-node communication network, each node is assigned a unique address. Messages between nodes generally include a header that precedes the information or data portion of the message. This header typically includes a destination address, this being the address of the node or station that is intended to receive the message. Normally, only the node with that particular address is permitted to receive and process the message.

Usually transceivers are used in pairs, one controlled by an operator and the other associated with a machine to be controlled by that operator. This pairing is accomplished by setting into a memory in each transceiver the identity of the paired transceiver. However, if this is done by means of a convenient mechanism, such as a digital "thumb-wheel", or even a coded plug-in chip, it offers the possibility of human error to establish two controllers for the same machine, or vice-versa, either case being unsafe.

The present invention provides an improved method and apparatus, which is particularly adapted to use between two radio frequency (RF) communication stations, to automatically exchange node address information for thereafter establishing a unique, secure communication link therebetween. This "handshake" is accomplished by temporarily connecting an electrical cable between the two stations. Once connected, each station automatically sends to the other station its own individual node address. The cable is then disconnected. Subsequent RF messages then include the node address of the transmitting station (i.e., the source address) as well as the node address of the intended receiving station (i.e., the destination address). Before a station can accept a message, the destination address must be that of the recipient node, and the source address must correspond to the address of the expected transmitting station.

Assume that a communications system 10 has four RF stations, labeled A, B, C and D in FIG. 1. All four stations are located in proximity to one another, and all four transmit on the same frequency. To establish an RF communication link between only stations A and B, node address information is exchanged by temporary connection of cable 11 therebetween. After the addressing information has been exchanged, stations A and B will have established a peer-to-peer communications link, and will function as a dedicated pair. Thus, after the exchange, station A will have a node address of, say, 123, and will expect to receive transmissions from station B, having a node address of, say, 234. Conversely, station B will expect to receive transmissions from station A, having a node address of 123. RF messages transmitted by stations C and D will be ignored, since neither the source or the destination address will match those of stations A and B. In FIG. 1, station C is depicted as having a node address of 345, and has been provided with the expected node address (234) of station B. An advantage of this is that it allows easy replacement of a node by non-technical personnel, while still maintaining the security of the link between the two transceivers of a dedicated pair.

Figure 2:
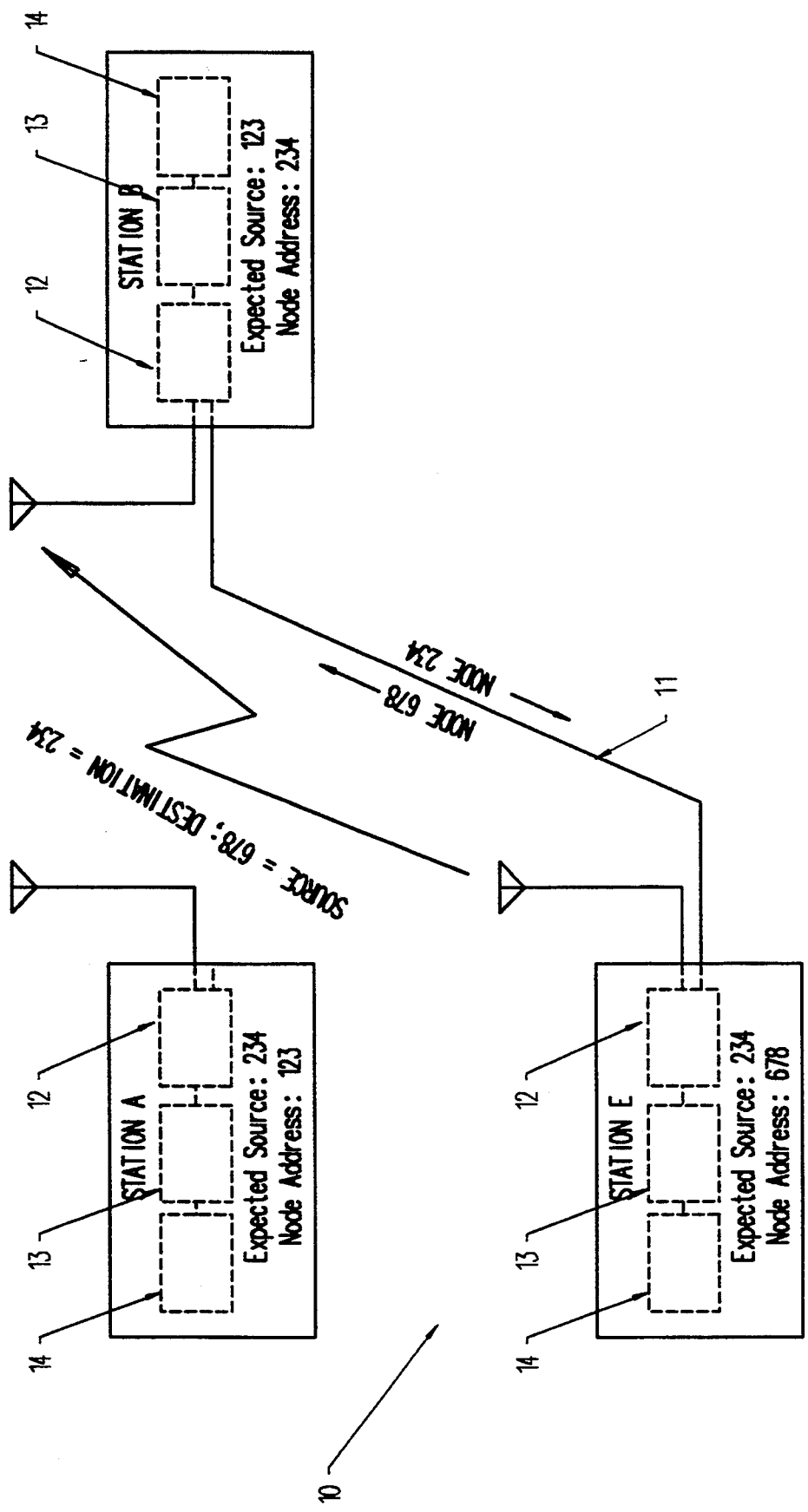
FIG. 2 is a schematic view generally similar to FIG. 1, with stations C and D removed, and showing the addition of station E to form a new dedicated pair with station B and to replace station A.

Assume that station A is taken out of service, and is to be replaced by station E, as shown in FIG. 2. Stations B and E are temporarily connected by cable 11, and node address information is exchanged therebetween. After this has occurred, stations B and E will accept messages only from one another, and not from any other station. Thus, the communications system requires AND logic between the respective addresses of the pair as a condition precedent to data exchange therebetween. If station A was reintroduced into the network a communication link would no longer exist between stations A and B. Station A might still transmit messages with station B as the destination address, but station B would ignore the message because it is now expecting to receive messages with the source address of station E.

The application of this invention is intended for, but not limited to, use in radio remote control, such as of mining equipment or the like. In a typical underground coal mine, there may be multiple mining machines. Each may be potentially operated by radio remote control. An accident, perhaps resulting in loss of human life, can occur if a receiving station accepts a message from an unexpected transmitting station, and therefore erroneously commands a mining machine in a dangerous or uncontrolled manner. Thus, there can be no cross-activation between similar machines.

Therefore, the present invention provides improved methods and apparatus for selectively enabling bi-directional communication only between the two transceivers of a dedicated pair.

The improved communication system includes a plurality (i.e., two or more) of transceivers adapted to communicate with one another vial a common communication path (e.g., a radio frequency, a common bus, etc.). The improved system includes "handshake" means, such as cable 11, for temporarily enabling the mutual exchange of identity codes between only two of the transceivers so as to establish a dedicated pair. Each transceiver has memory means 12 for receiving and storing the identity code of the other transceiver of the pair during the mutual exchange and for simultaneously purging any previously-stored identity code(s). Each transceiver has addressing means for identifying all communications transmitted by it as having been originated by it and being addressed to the other of the pair. Each transceiver has acceptance means 14 for accepting transmitted communications only if addressed to it and identified as having originated from the other transceiver. Thus, one transceiver of a pair will only communicated with the other transceiver of that pair.

In order to accomplish a foolproof address exchange, the "handshake" means must insure true mutuality and simultaneity of address data exchange. That is to say, it must preclude any unilateral data transmission which might allow a single transceiver to establish in sequence a communication potential with more than one other transceiver. Hence, it must not only enable an identifying transmission, it must also establish the presence of a receiver, and purge any prior receive identification memory before transmitting. Once the "handshake" is broken, further transmissions must be addressed to the newly-identified receiver. Lack of a stored receiver identity would prevent any transmission.

Thus, the preferred embodiment of such "handshake" means is an electrical cable having identical connectors on both ends, which connect to identical mating connectors on the transceivers. Mutuality would be established by causing each transceiver to sense an impedance or voltage created by the other, causing it to purge its source memory before transmitting its own address.

The physical line up by means of a cable having only two ends clearly limits the "handshake" to a pair of transceivers. The data exchange could preferably be carried by special channels in the cable, which inherently excludes all extraneous data.

While a preferred embodiment of the invention has been shown and described, and several modifications thereof discussed, persons skilled in this art will readily appreciate that various changes and modifications may be made without departing from the spirit of the invention, as defined and differentiated by the following claims.

We claim:

1. A communication system, comprising:
   a plurality of transceivers adapted to communicate with one another via a common communication path, each transceiver having a unique individual identity code;
   handshake means for temporarily enabling the mutual exchange of identity codes between only two of said transceivers so as to establish a dedicated pair;
   each transceiver having memory means for receiving and storing the identity code of the other transceiver of said pair during said mutual exchange and for simultaneously purging any previously-stored identity code;
   each transceiver having addressing means for identifying by means of its unique individual identity code all communications transmitted by it as having been originated from it and being addressed to only the other of said pair as identified by the individual identity code of such other; and
   each transceiver having acceptance means for accepting transmitted communications only if addressed to it and identified as having originated from the other transceiver of said pair;
   whereby one transceiver of a pair will only communicate with the other transceiver of said pair.

2. A communication system as set forth in claim 1 wherein the identity code of each transceiver is preset and may not be changed.

3. A communication system as set forth in claim 1 wherein said handshake means is arranged to enable the mutual exchange of identity codes along a communication path different from the normal common communication path between said transceivers.

4. A communication system as set forth in claim 3 wherein the identity code exchange communication path is an electrical conductor.

5. A communication system as set forth in claim 3 wherein each transceiver has exchange means for transmitting its identity code automatically to the other transceiver of said pair when said pair of transceivers are joined by such different communication path.

6. A communication system as set forth in claim 4 wherein each transceiver has exchange means for transmitting its identity code automatically to the other transceiver of said pair when said pair of transceivers are joined by said electrical conductor.

7. The method of establishing selective communication between only two of a plurality of transceivers adapted to communicate with one another via a common communication path, each transceiver having a unique individual identity code, comprising the steps of:
   temporarily enabling the mutual exchange of identity codes only between two of said transceivers so as to establish a dedicated pair;
   receiving and storing in one transceiver of said pair the identity code of the other transceiver of said pair during said mutual exchange and simultaneously purging any previously-stored identity code in said one transceiver;
   identifying all communications transmitted by said one transceiver as having originated from said one transceiver and being addressed to said other transceiver; and
   accepting transmitted communications in said other transceiver only if addressed to it and identified as having originated from said one transceiver;
   thereby to establish selective communication only between the transceivers of said pair.

* * * * *